United States Patent Office 3,792,081
Patented Feb. 12, 1974

3,792,081
ESTERS OF HYDANTOIC ACID
Takeru Higuchi, Lawrence, Kans., and Valentino J. Stella, Forest Park, Ill., assignors to Alza Corporation
No Drawing. Continuation-in-part of abandoned application Ser. No. 197,962, Nov. 11, 1971. This application Apr. 7, 1972, Ser. No. 242,214
Int. Cl. C07c 127/18
U.S. Cl. 260—472          8 Claims

ABSTRACT OF THE DISCLOSURE

Novel esters of substituted hydantoic acids of the formula:

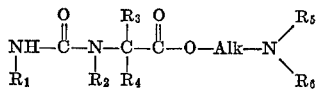

wherein $R_1$ and $R_2$ are hydrogen or alkyl, $R_3$ and $R_4$ are hydrogen, alkyl or phenyl, $R_5$ and $R_6$ are hydrogen or alkyl, Alk is alkylene and the pharmaceutically acceptable acid addition salts thereof. The compounds of the formula are useful as anticonvulsants and antiepileptics.

CROSS-REFERENCE TO RELATED APPLICATION

This application is a continuation-in-part of our co-pending application U.S. Ser. No. 197,962, now abandoned, filed on Nov. 11, 1971 and assigned to the assignee of this application.

BACKGROUND OF THE INVENTION

The present invention relates to novel and therapeutically useful hydantoic acid esters and to a method for using same. More particularly, the invention pertains to new hydantoate compounds represented by Formula 1 of the following general formula:

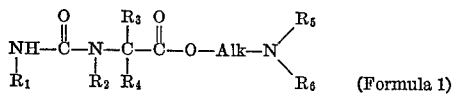 (Formula 1)

wherein $R_1$ and $R_2$ are the same or different and they are a member selected from the group consisting of hydrogen and lower alkyl, $R_3$ and $R_4$ are the same or different and they are a member selected from the group consisting of hydrogen, lower alkyl and phenyl, $R_5$ and $R_6$ are the same or they are different and they are a member selected from the group consisting of hydrogen and lower alkyl, Alk is an alkylene of 1 to 4 carbons and the non-toxic, therapeutically acceptable acid addition salts thereof. The compounds are useful as anticonvulsants and as anti-epileptics, and they can be administered per se or in pharmaceutical composition form when admixed with a pharmaceutically acceptable carrier.

A pharmaceutical and medical need exists for new and useful compounds indicated for the management of epilepsy and other kinds of convulsive states. This need exists because compounds such as 5,5-diphenyl hydantoin, generically known as phenyltoin, and 5-ethyl-3-methyl-5-phenyl hydantoin, generically known as mephenytoin, as most commonly and widely used for the treatment of these conditions possess a low bioavailability per se and from pharmaceutical dosage forms. For example, 5,5-diphenyl hydantoin which has a therapeutic index between one and two, a pKa of 8.3, and a solubility of less than 4 mg. in 100 ml. at 37° C. often produces unpredictable erratic release patterns form a formulation both in vivo and in vitro as generally attributed to these physicochemical characteristics. Also, when 5,5-diphenyl hydantoin is orally administered in the form of its sodium salt, it frequently causes gastric irritation due to the alkalinity of the administered dosage form. For intravenous administration, sodium 5,5-diphenyl hydantoin is generally used in a formulation comprised of 40% propylene glycol and 10% alcohol in water adjusted with sodium hydroxide to a high alkaline pH. Intravenous administration of this formulation frequently leads to precipitation and also to erratic blood levels. Other hydantoin previously mentioned have similar problems to those seen with 5,5-diphenyl hydantoin. This common and wide use of the hydantoins with their accompanying disadvantages creates an immediate and pressing need for new and useful pharmaceutical compounds that possess therapeutic properties useful for treating epilepsy and other convulsive states while remaining essentially free from the unwanted effects associated with the prior art compounds.

SUMMARY OF THE INVENTION

Accordingly, it is an immediate object of this invention to provide novel pharmaceutical compounds that are useful as antiepileptics and as anticonvulsants.

Another object of the invention is to provide novel and useful physiochemical esters of hydantoic acid that are essentially free from the unwanted effects associated with the prior art.

Still another object of the invention is to provide new and useful hydantoic acid esters that possess increased solubility and stability and can be administered in standard, pharmaceutical formulations.

Yet still another object of the invention is to provide hydantoate compounds of the following general formula:

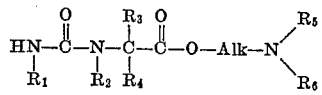

wherein $R_1$ and $R_2$ are hydrogen or alkyl, and $R_3$ and $R_4$ are hydrogen, alkyl or phenyl, $R_5$ and $R_6$ are hydrogen or alkyl, Alk is alkylene, and the pharmaceutically acceptable salts thereof. The compounds are useful as antiepileptics and anticonvulsants and they can be administered per se or in pharmaceutical composition form when admixed with a pharmaceutically acceptable carrier.

These and other objects of the invention will become apparent from a consideration of the accompanying disclosure and the appended claims.

DESCRIPTION OF INVENTIVE EMBODIMENTS

In the present disclosure and the accompanying claims the definitions of symbols and terms in the foregoing formula and where they appear elsewhere throughout this specification and the accompanying claims, their usage thereof has the following significance:

By "lower alkyl" is meant straight or branched chain alkyl radicals of 1 to 6 carbon atoms inclusive, such as methyl, ethyl, n-propyl, iso-propyl, n-butyl, sec-butyl, pentyl, neo-pentyl, n-hexyl, iso-hexyl, and the like.

In the structural formula "Alk" represents a bivalent saturated aliphatic hydrocarbon radical, that is, a straight or branched chain alkylene moiety of 1 to 4 carbon atoms inclusive such as methylene, ethylene, propylene, iso-propylene, butylene, and the like.

The phrases, "pharmaceutically acceptable" and "non-toxic and addition salts" as used herein generally includes the non-toxic acid addition salts of the compounds of Formula 1 formed with non-toxic inorganic and organic acids. For example, the salts include those derived from inorganic acids such as hydrochloric, hydrobromic, sulfuric, sulfamic, phosphoric, nitric and the like; and, the salts prepared from organic acids such as acetic, propionic, succinic, glycollic, stearic, latic, malic, tartaric, citric, ascorbic, pamoic, maleic, hydroxymaleic, phenylacetic, glutamic, benzoic, salicylic, sulfanilic, fumaric, salicylic, toluenesulfonic, and the like.

The novel compounds of the invention can be prepared by various procedures known to the chemical art. One procedure, for example, comprises the conversion of a hydantoin under the action of alkali and heat to produce the corresponding amino acid. Next, the just prepared amino acid is reacted with an aliphatic haloformate, which has the grouping characteristic of an acid chloride and exhibits the properties of such compound; in an alkaline environment to introduce a carboalkoxy moiety into the amino acid and to yield thereby the corresponding, substituted N-alkoxycarbonyl amino acid.

The N-alkoxycarbonyl-substituted amino acid is reacted with an acid halide of the inorganic or organic type to form the acid chloride of the amino acid which in situ undergoes cyclization with a ring closure leading to a heterocyclic, substituted oxazolidinedione. Next, the latter heterocyclic compound is reacted with an unsubstituted or substituted amino alcohol usually in the presence of an acid or other suitable catalysts for an exchange esterification of the heterocyclic compound and also for opening the ring to produce the corresponding ester. This ester is related with an alkylisocyanate or arylisocyanate in an addition reaction to yield the desired, novel substituted hydantoates of the invention.

Another procedure for synthesizing the novel hydantoate compounds of the invention comprises using commercially available amino acids substituted with lower alkyl and aryl groups as the starting reagent in lieu of the substituted or unsubstituted hydantoin. Alternatively, the starting amino acid can be prepared by reacting a ketone substituted with alkyl moieties or a phenone with cyanide to yield the corresponding nitrile which is hydrolyzed to the amide. The amide on further hydrolysis is converted to the amino acid according to the procedure as described in Organic Synthesis, Collective Volume 3, pp. 88–90, 1965, John Wiley & Sons, Inc., New York.

The pharmaceutically acceptable acid addition salts of the present invention can be synthesized from the compounds embraced by Formula 1 by conventional, chemical methods. Generally, the salts are prepared by reacting the free base with stoichiometric amounts or with an excess thereof of the desired salt forming inorganic or organic acid in a suitable solvent or various combination of solvents. For example, the free base can be dissolved in an aqueous solution of the appropriate acid and the salt recovered by standard techniques, for example, by evaporation of the solution. Alternatively, the free base can be dissolved in an organic solvent such as a lower alkanol, an ether, an alkyl ester, or mixture thereof, for example, methanol, ethanol, ether, ethyl acetate, ethyl acetate-ether solution, and the like and then it is treated with the appropriate acid to form the corresponding salt. The salt is recovered by standard, recovery techniques, for example, by filtration of the desired salt on spontaneous separation from the solution, or it can be precipitated by the addition of a solvent in which the salt is insoluble and recovered therefrom.

DESCRIPTION OF INVENTIVE EXAMPLES

The following examples are set forth as representative methods of the spirit of the invention. These examples are not to be construed as limiting the scope of the invention as other functionally equivalent means will be readily apparent to those skilled in the subject art in the light of the present specification and accompanying claims.

EXAMPLE 1

Preparation of β - N',N' - diethylaminoethyl-2-ethyl-5-methyl-2-phenyl hydantoate. First, 10 grams, 0.046 mole, of commercially available 5-ethyl-3-methyl-5-phenylhydantoin was placed in a standard reaction vessel and 200 milliliters of 20% sodium hydroxide added thereto with constant stirring of the reactants. The system was placed under nitrogen and the mixture heated to about 180° to 190° C. at a pressure of 170 to 180 lb. per sq. in. for about 5 hours. Then, the mixture was cooled to room temperature, filtered through charcoal and diluted to 500 ml. with distilled water. This solution was neutralized with glacial acetic acid and concentrated in vacuo to about 150 ml. The crystalline material precipitated was filtered and washed with 200 ml. of distilled water and then with 200 ml. of ether, to yield 5.5 grams of the product 2,2-ethyl-phenylglycine with a melting point of 288° C.

Next, three grams, 0.017 mole, of 2,2-ethylphenylglycine was dissolved in 30 ml. of 1 N NaOH with constant stirring followed by an excess of ethylchloroformate, 5 grams, 0.047 mole, added dropwise to the reaction while maintaining the pH of the reaction alkaline by the addition of sodium hydroxide pellets. The reaction mixture was allowed to stir until there was no detectable odor of ethylchloroformate. Next, the reaction solution was extracted twice with 50 ml. portions of anhydrous diethyl ether, to remove any ether soluble impurities, and the remaining aqueous layer was then acidified with hydrochloric acid and again extracted four times with 50 ml. portions of ether. After drying over anhydrous magnesium sulfate, the second ether extraction was evaporated by standard, rotary evaporation for about one hour. Next, about 15 ml. of benzene was added with gentle warming to complete the solution. Finally, the product was recovered by adding n-hexane dropwise to cause cloudiness and precipitation of a white solid. The solid, N-ethoxycarbonyl-2,2-ethylphenyl glycine had a melting point of 130°–131° C. and the yield was 1.5 grams.

Next, five ml. of thionyl chloride was added to 700 mg., 0.003 mole of N-ethoxycarbonyl-2,2-ethylphenyl glycine and the reactants refluxed for about one hour. At the end of this period, the excess thionyl chloride was removed by rotary evaporator leaving a yellow solid. The solid was dissolved in benzene and precipitated with n-hexane to yield a white compound, 4,4-ethylphenyloxazolidinedione. The compound had a melting point of 99 to 100° C. and the yield was 550 mg.

To 500 mg., 0.002 mole of 4,4-ethylphenyloxazolidinedione, as prepared above, was added a slight excess, 400 mg. 0.003 mole of freshly distilled diethylaminoethanol in a dry flask at 140° C. An atmosphere of HCl was passed over the melt and these conditions were maintained for 20 to 25 minutes to produce a syrupy melt. The syrupy melt was taken up in chloroform and extracted with 0.1 N NaOH and water. After drying, the chloroform layer was evaporated to about 0.5 ml. and 500 mg., 0.009 mole of methylisocynate added thereto. The solution was allowed to stand at ambient conditions for about 20 minutes and evaporated to remove the excess methylisocyanate. The remaining oil was dissolved in n-hexane and precipitated as a solid with a melting point of 83–87° C. The solid was redissolved in chloroform and extracted with two 50 ml. aliquots of water. After drying over anhydrous magnesium sulfate and evaporating the chloroform layer gave a white solid having a melting point of 88–89° C.

The compound, β - N'N'-diethylaminoethyl-2-ethyl-5-methyl-2-phenyl hydantoate had a calculated elemental analysis for carbon 64.50, hydrogen 8.66 and nitrogen 12.52. The found analyses for carbon was 64.77, hydrogen 8.86 and nitrogen 12.76. The NMR data for the compound, as run in CDCl$_3$ was as follows: 0.85–1.55δ (multiple peaks), 9, —N(CH$_2$CH$_3$)$_2$ and

—φC(CH$_2$CH$_3$)—;

2.45–3.00δ (multiple peaks), 11, —CH$_2$N(CH$_2$CH$_3$)$_2$ and —NHCH$_3$ and —φ—C(CH$_2$CH$_3$)—; 4.40δ (triplet), 2, —CH$_2$CH$_2$; 5.00δ (broad), 1, —NHCH$_3$; 6.35δ (broad), 1,

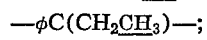

7.60δ (multiplet), 5, —φC(C$_2$H$_5$)—.

EXAMPLE 2

Repeating the procedure of Example 1 but replacing diethylaminoethanol with the following:

dimethylaminoethanol,
di-n-propylaminoethanol,
methylethylaminoethanol,
diethylaminomethanol, and
diethylaminopropanol, the following novel hydantoates are formed:

β-N'N'-dimethylaminomethyl-2-ethyl-5-methyl-2-phenyl hydantoate,
β-N'N'-di-n-propylaminoethyl-2-ethyl-5-methyl-2-phenyl hydantoate,
β-N'N'-methylethylaminoethyl-2-ethyl-5-methyl-2-phenyl hydantoate,
N'N'-diethylaminomethyl-2-ethyl-5-methyl-2-phenyl hydantoate, and
β-N'N'-diethylaminopropyl-2-ethyl-5-methyl-2-phenyl hydantoate.

EXAMPLE 3

Employing the procedure of Example 1 and Example 3 but replacing the methylisocyanate with a stoichiometrically equivalent amount or with an excess thereof of the following monoisocyanates:

ethyl isocyanate,
butyl isocyanate,
propyl isocyanate,
iso-propyl isocyanate, and
iso-butyl isocyanate, there is obtained the following novel hydantoates of the invention in comparably high yields:

β-N'N'-diethylaminoethyl-2-ethyl-5-ethyl-2-phenyl hydantoate,
β-N'N'-dimethylaminomethyl-2-ethyl-5-butyl-2-phenyl hydantoate,
β-N'N'-di-n-propylaminoethyl-2-ethyl-5-butyl-2-phenyl hydantoate,
β-N'N'-methylethylaminoethyl-2-ethyl-5-propyl-2-phenyl hydantoate,
N'N'-diethylaminoethyl-2-ethyl-5-iso-propyl-2-phenyl hydantoate, and
β-N'N'-diethylaminopropyl-2-ethyl-5-iso-butyl-2-phenyl hydantoate.

EXAMPLE 4

Following the procedure of Example 1 but substituting for 5 - ethyl - 3 - methyl-5-phenylhydantoin, the following hydantoins:

5-methyl hydantoin,
5-ethyl hydantoin,
5-isobutyl hydantoin,
5-phenyl hydantoin,
5,5-dipropyl hydantoin,
5-ethyl-5-isopropyl hydantoin,
5-methyl-5-isopropyl hydantoin, and
5,5-di-isobutyl hydantoin, the following novel hydantoates are formed:

β-N'N'-diethylaminoethyl-2,5-dimethyl hydantoate,
β-N'N-diethylaminoethyl-2-ethyl-5-methyl hydantoate,
β-N'N'-diethylamino-2-isobutyl-5-methyl hydrantoate,
β-N'N-diethylamino-2-phenyl-5-methyl hydantoate,
β-N'N-diethylamino-2,2-dipropyl-5-methyl hydantoate,
β-N'N-diethylamino-2-ethyl-2-isopropyl-5-methyl hydantoate,
β-N'N-diethylamino-2-methyl-2-isopropyl-5-methyl hydantoate, and
β-N'N'-diethylamino-2,2-di-isopropyl-5-methyl hydantoate.

EXAMPLE 5

Preparation of β-N'N'-diethylaminoethyl-5-methyl-2,2-diphenyl hydantoate. To thirty grams of 2,2-diphenyl glycine of Formula 2 as shown,

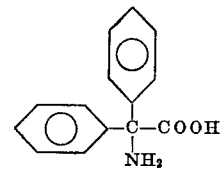

and as synthesized from benzophenone according to the procedure used in Organic Synthesis, Coll. vol. 3, pp. 88–91, 1965 in a round bottomed borosilicate flask was added 300 ml. of 1 normal sodium hydroxide with stirring to mix the ingredients. Next, to this solution 100 ml. of ethyl chloroformate was added dropwise with continuous stirring at room temperature while keeping the pH of the solution alkaline by the addition of sodium hydroxide pellets. After all the ethyl chloroformate was added, the solution was stirred for an additional two hours, or a little longer until no chloroformate odor was detected. The reaction of the amino acid and the chloroformate is represented by Equation A as follows:

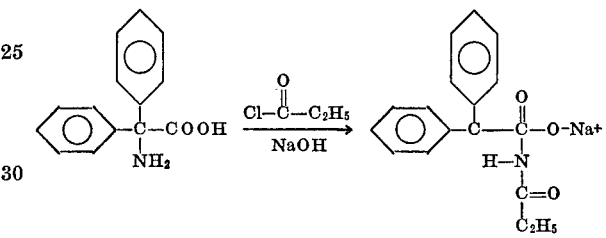

The above reaction mixture was then acidified with concentrated hydrochloric acid to a pH of 1–2 and the oily layer extracted with 50 ml. of chloroform 5 times. The organic layer was then dried over anhydrous sodium sulfate and placed in the refrigerator overnight. Then, the solution was filtered, and the filtrate evaporated to a viscous oil. Next, the viscous oil was dissolved in a small amount of chloroform and petroleum ether was added to produce cloudiness, and the solution was allowed to crystallize in the refrigerator. The crystals were recovered by filtration to yield the compound of Formula 3 as follows:

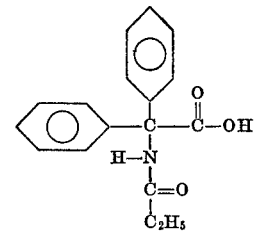

Next, 14 grams of the compound of Formula 3 was refluxed with 50 ml. of thionyl chloride at 70 to 80° C. for about one hour. The excess thionyl chloride was removed by standard rotary evaporator techniques, and to the resulting oily material, a few drops of benzene were added and a few drops of petroleum ether to cause precipitation. The precipitate was filtered and dried to yield the product as shown in Equation B:

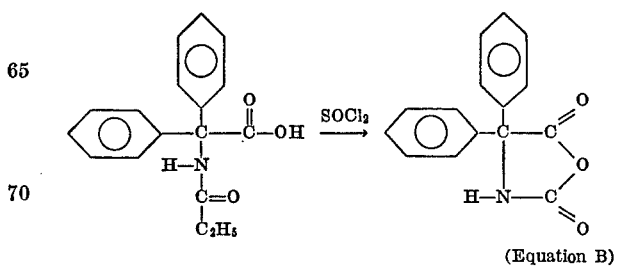

(Equation B)

The product of Equation B was placed in a flask under a blanket of hydrogen chloride gas and heated to 100 to 120° C. Then, and equimolar amount plus a 3% excess of freshly distilled diethylaminoethanol was added and the temperature maintained at 100 to 120° C. for at least 30 minutes, under a continuous HCl gas flush. At the end of this period, the syrupy melt was cooled to room temperature and dissolved in chloroform. The chloroform layer was extracted with 50 ml. of 0.1 N sodium hydroxide, washed several times with distilled water and dried over anhydrous sodium sulfate. The solution was filtered and the chloroform evaporated to yield the product β-N',N'-diethylaminoethyl-2,2-diphenyl glycinate as shown in the following Equations C and D:

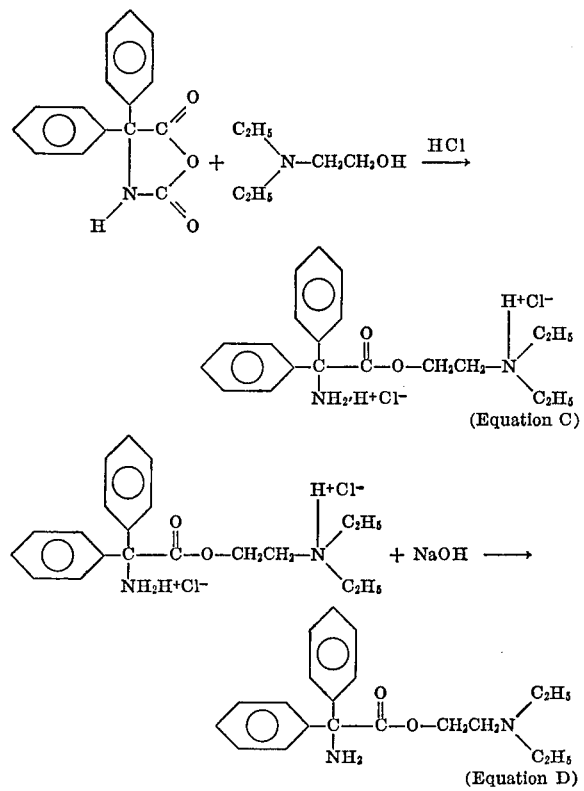

The product of Equation D was dissolved in a small amount of chloroform and a two fold excess of methylisocyanate added dropwise with continuous stirring during the addition. The reaction was allowed to proceed under ambient conditions for about twenty minutes and the excess methyl isocyanate removed by evaporation. The resulting oily mixture was dissosved in a small amount of boiling ether, and drops of petroleum ether were added to visible cloudiness, and the solution stored in the freezer overnight. The product was recovered by filtering and recrystallizing the compound from chloroform petroleum ether. The addition of the alkyl isocyanate to the ester is represented in Equation E:

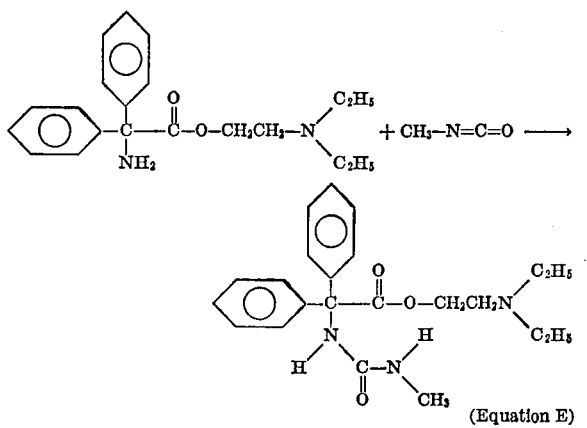

The compound had a melting point of 133–134° C., a calculated elemental analysis for carbon 68.95, hydrogen 7.60 and nitrogen 10.97. The found analysis for the ester was carbon 69.10, hydrogen 7.49 and nitrogen 10.56. The analytical nuclear magnetic resonance data for the compound was as follows: 0.96δ (triplet), 6, —N(CH$_2$CH$_3$)$_2$; 2.40δ (quartet), 2.50δ (singlet), 2.55δ (triplet) all integrated for 9 protons, —CH$_2$N(CH$_2$CH$_3$)$_2$ and —NHCH$_3$ 4.20δ (triplet), 2, —OCH$_2$CH$_2$—; 4.60δ (broad), 1, —NHCH$_3$; 6.20δ (broad), 1,

—CO—NH—C(φ)$_2$—

7.35δ (multiplet), 10, —C(φ)$_2$—.

EXAMPLE 6

Following the procedure of Example 5, but substituting for benzophenone the following phenones: propiophenone, CH$_3$CH$_2$COC$_6$H$_5$, acetophenone, CH$_3$COC$_6$H$_5$, isobutyrophenone, (CH$_2$)CHCOC$_6$H$_5$, butyrophenone, CH$_3$CH$_2$CH$_2$COC$_6$H$_5$, and privalophenone (CH$_3$)$_3$CCOC$_6$H$_5$ in the procedure described in Organic Synthesis, Coll. Vol. 3, pp. 88–91, 1965, the following amino acids are synthesized: 2-amino-2-phenyl butanoic acid,

CH$_3$CH$_2$CC$_6$H$_5$NH$_2$COOH, 2-amino-2-phenylpropanoic acid, CH$_3$CC$_6$H$_5$NH$_2$COOH, 2-amino-3-methyl-2-phenylbutanoic acid, (CH$_3$)$_2$CHCC$_6$H$_5$NH$_2$COOH, 2-amino-2-phenyl pentanoic acid,

CH$_3$CH$_2$CH$_4$CC$_6$H$_5$NH$_2$COOH, and, 2-amino-3,3-dimethyl - 2 - phenyl butanoic acid, CH$_3$CCH$_3$CH$_3$CC$_6$H$_5$NH$_2$COOH, which amino acids are used in the procedure of Example 5 to yield the following novel hydantoates:

β-N'N'-diethylaminoethyl-2-ethyl-5-methyl-2-phenyl hydantoate,
β-N'N'-diethylaminoethyl-2,5-dimethyl-2-phenyl hydantoate,
β-N'N-diethylaminoethyl-2-isopropyl-5-methyl-2-phenyl hydantoate,
β-N'N-diethylaminoethyl-5-methyl-2-phenyl-2-propyl hydantoate, and
β-N'N'-diethylaminoethyl-2-tert-butyl-5-methyl-2-phenyl hydantoate.

EXAMPLE 7

The preparation of β-N',N-diethylaminoethyl-2,2-diphenyl hydantoate is arrived at by following the procedure of Example 5, and all the steps of synthesis are repeated to yield the product of Equation D, earlier identified, as follows:

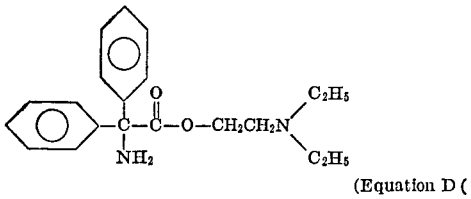

(Equation D (

Then, 0.1 mole of the product of Equation D is dissolved in 100 ml. of glacial acetic acid and 0.11 mole of potassium cyanate (KCNO) is slowly added with constant stirring, 5° C. for 30 minutes. Next, the mixture is stirred at room temperature for an additional two hours.

At the end of the stirring, the reaction mixture is transferred to a 500 ml. separatory funnel and 100 ml. of chloroform is added thereto. The solution is extracted with 50 ml. of water at 4° C. and the chloroform layer is separated to a flask containing anhydrous sodium sulfate and the aqueous layer is re-extracted with 30 ml. of chloroform. Then, this chloroform layer is added to the first layer over sodium sulfate. The solution is left over sodium sulfate for about 1 hour and then filtered. Next, the chloroform is carefully removed with a rotary evaporator at 30° C., and the remaining material dissolved in 35 ml. of acetone.

Next, the product is separated as the nitrate salt according to the following procedure: first, 0.15 mole of nitric acid, as a 70% aqueous solution, is dissolved in 15 ml. of acetone. The nitrate salt is precipitated by the addition of 500 ml. of ether with continuous stirring, and the resulting crystalline material is filtered off and washed with ether. The product obtained is melted at 172° C. with decomposition. The sulfate, hydrochloride, hydrobromide, hydrocodide, methyl sulfonate and salicylate salts were prepared in a similar manner.

EXAMPLE 8

Following the procedure of Example 5 and Example 7, to 0.1 mole of

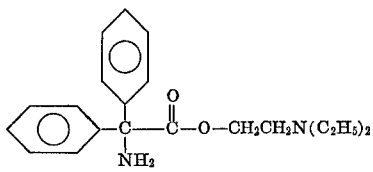

dissolved in chloroform is added 0.11 mole of N,N-dimethoxymethyl carbamyl chloride,

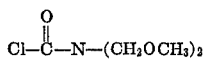

and the mixture allowed to react. The chloroform is then removed and the methoxy methyl groups cleaned with 0.1 N HCl. The reaction mixture is then lyophilized to yield the final product, a hydrochloride salt as set forth in the following reaction sequence:

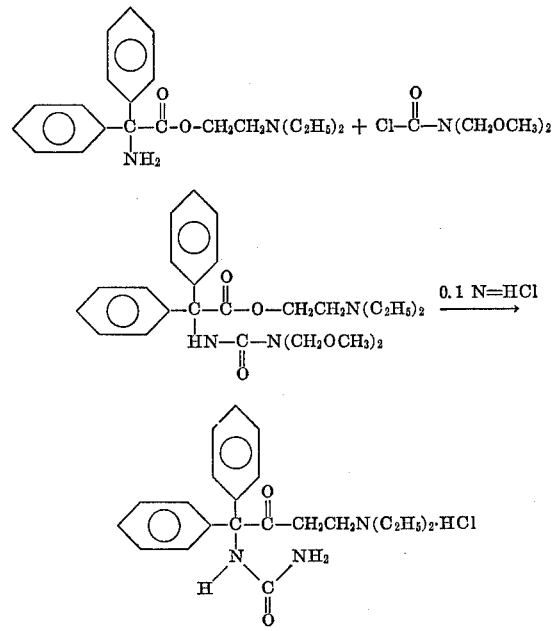

The anticonvulsant activity of the compounds of the invention was demonstrated in a standard electroshock test. The test is comprised of applying a supra-maximal current of 20 ma., milliamperes, across the ears of a mouse carried for 0.2 second to induce convulsions. The test is carried out with random bred albino, female mice, about 3 to 6 weeks old and having an average weight of 11 grams, with a variation of 8 to 15 grams. The mice were divided into four sets of 10 and then submitted to electroshock. All the mice tested required severe resuscitation after the current was disconnected. Next, the first set of mice were given intraperitoneal 50 mg./kg. of β-N'N'-diethylaminoethyl-2-ethyl-5-methyl-2-phenyl hydantoate, the second set of mice were given 100 mg./kg. of the same hydantoate by the same route of administration, and the third set of mice were administered intraperitoneally a larger dose of 150 mg./kg. of the same hydantoate. The fourth set of mice were administered 25 mg./kg. intraperitoneally of β-N'N'-diethylaminoethyl-5-methyl-2,2-diphenyl hydantoate. After these injections, the mice were returned to their cages and allowed to rest for 1 hour. Next, each mouse was again submitted to the electroshock. The results of the test indicated that at the administered doses the new compounds of the invention protected the mice against electroshock. The test data also indicated that β-N'N-diethylaminoethyl-2-ethyl-5-methyl-2-phenyl hydantoate possesses an $ED_{50}$ against electroshock of approximately 60 mg./kg., and that it has an $LD_{50}$ between 400 to 800 mg./kg., as previously determined, with a therapeutic index of around 10. For the novel hydantoate, β-N'N'-diethylaminoethyl-5-methyl-2,2-diphenyl hydantoate, protection against electroshock was observed at administered dosage amounts of 25 mg./kg.

The improved solubility of the novel compounds was demonstrated by conventional partitioning and solubility tests. In the partitioning tests, a mixture of chloroform-carbon tetrachloride in the ratio of 1 to 3, volume for volume, was prepared and mixed with a phosphate buffer having a pH of 6. Next, β-N'N'-diethylaminoethyl-2-ethyl-5-methyl-2-phenyl hydantoate was added to the above mixture, it was shaken, and on the partitioning of the compound between the $CHCl_3$-$CCl_4$ layer and the aqueous layer it was observed that nearly all of the added hydantoate passed into the aqueous layer. In the solubility test, the same hydantoate was added in increments to an aqueous phosphate buffer of pH 6 with the compound dissolved therein at a concentration of 12.2 mg./ml., which gives an aqueous solubility for β-N'N'-diethylamino-2-ethyl-5-methyl-2-phenyl hydantoate, as the protonated form, at greater than 1.22 g./ml.

The novel and useful hydantoate compounds of the invention can be used by the pharmaceutical and the veterinary arts for their antiepileptic and anticonvulsant effects in a variety of pharmaceutical or veterinary preparations. In these preparations, the new compounds are administrable in the form of tablets, pills, powder mixtures, capsules, injectables, solutions, suppositories, emulsions, dispersions, food premix, and in other suitable form. The pharmaceutical or veterinary preparation which contains the compound is conveniently admixed with a nontoxic pharmaceutical organic carrier or a nontoxic pharmaceutical inorganic carrier, usually about 0.01 mg. up to 2500 mg., or higher per dosage unit. Typical of pharmaceutically acceptable carriers are, for example, lactose, potato and maize starches, magnesium stearate, talc, vegetable oils, polyalkylene glycols, ethyl cellulose, poly(vinylpyrrolidone), calcium carbonate, ethyl oleate, isopropyl myristate, benzyl benzoate, sodium carbonate, gelatin, potassium carbonate, silicic acid, and other conventionally employed acceptable carriers. The pharmaceutical preparation may also contain nontoxic auxiliary substances such as emulsifying, preserving, wetting agents, and the like, as for example, sorbitan monolaurate, triethanolamine oleate, polyoxyethylene monostearate, glyceryl tripalmitate, dioctyl sodium sulfosuccinate, and the like.

Exemplary of a typical method for preparing a tablet containing the active agents is to first mix the agent with a nontoxic binder such as gelatin, acacia mucilage, ethyl cellulose, or the like. The mixing is suitably carried out in a standard V-blender and usually under anhydrous conditions. Next, the just prepared mixture can be slugged through conventional tablet machines and the slugs fabricated into tablets. The freshly prepared tablets can be coated, or they can be left uncoated. Represented of suitable coatings are the nontoxic coatings including shellack, methylcellulose, carnauba wax, styrene-maleic acid copolymers, and the like. For oral administration, compressed tablets containing 0.01 milligram, 5 milligrams, 25 milligrams, 50 milligrams, etc., up to 2500 milligrams are manufactured in the light of the above disclosure and by art known fabrication techniques well known to the art and set forth in Remington's Pharmaceutical Science, chapter 39, Mack Publishing Co., 1965. The pharmaceutical manufacture of a formulation is shown in Example 9.

EXAMPLE 9

| Ingredients: | Per tablet, mg. |
|---|---|
| β-N'N'-diethylaminoethyl-2-ethyl-5-methyl-2-phenyl hydantoate | 50.0 |
| Corn starch | 15.0 |
| Corn starch paste | 4.5 |
| Calcium carbonate | 15.0 |
| Lactose | 67.0 |
| Calcium stearate | 2.0 |
| Dicalcium phosphate | 50.0 |

To formulate the tablet, uniformly blend the β-N'N'-diethylaminoethyl-2-ethyl-5-methyl-2-phenyl hydantoate, corn starch, lactose, dicalcium phosphate and calcium carbonate under dry conditions in a conventional V-blender until all the ingredients are uniformly mixed together. Next, the corn starch paste is prepared as a 10% paste and it is blended with the just prepared mixture until a uniform mixture is obtained. The mixture is then passed through a standard light mesh screen, dried in an anhydrous atmosphere and then blended with calcium stearate, and compressed into tablets, and coated if desired. Other tablets containing 10, 50, 100, 150 mgs., etc., are prepared in a like fashion.

EXAMPLE 10

| Ingredients: | Per tablet, mg. |
|---|---|
| β-N'N'-diethylaminoethyl-2,2-diphenyl hydantoate | 50.0 |
| Corn starch | 15.0 |
| Corn starch paste | 4.5 |
| Calcium carbonate | 15.0 |
| Lactose | 67.0 |
| Calcium stearate | 2.0 |
| Dicalcium phosphate | 50.0 |

The manufacture of capsules containing 10 milligrams to 2500 milligrams for oral use consists essentially of mixing the active compound with a nontoxic carrier and enclosing the mixture in a polymeric sheath, usually gelatin or the like. The capsules can be in the art known soft form of a capsule made by enclosing the compound in intimate dispersion within an edible, compatible carrier, or the capsule can be a hard capsule consisting essentially of the novel compound mixed with a nontoxic solid, such as talc, calcium stearate, calcium carbonate, or the like. Exemplary of a typical use for employing a capsule containing 100 mg. of β-N'N'-diethylaminoethyl-2-ethyl-5-methyl-2-phenyl hydantoate for use as therapeutically indicated ad libitum for antiepileptic effects. Capsules containing 25 mg., 75 mg., 125 mg., 250 mg., and the like, of the novel compounds, singularly or mixtures of two or more of the novel compounds are prepared, for example, as follows:

EXAMPLE 11

| Ingredients: | Per capsule, mg. |
|---|---|
| Active hydantoate | 50.0 |
| Calcium carbonate | 100.0 |
| Lactose, U.S.P. | 200.0 |
| Starch | 130.0 |
| Magnesium stearate | 4.5 |

The above ingredients are blended together in a standard blender and then discharged into commercially available capsules. When higher concentrations of the active agent is used, a corresponding reduction is made in the amount of lactose.

The dose administered, whether a single dose, multiple dose, or a daily dose, will of course, vary with the particular compound of the invention employed because of the varying potency of the compound, the chosen route of administration, the size of the recipient and the nature of the epileptic seizure and other states characterized by involuntary movements such as Parkinson's syndrome. The dosage administered is not subject to definite bounds, but it will usually be an effective amount, or the equivalent on a molar basis of the pharmacologically active free form produced from a dosage formulation upon the metabolic release of the active drug to achieve its desired pharmacological and physiological effects. The dosage administered for the management of grand mal, petit mal, psychomotor equivalent seizures and other forms of convulsive seizures is for mammals, including primates and humans a general oral dose of 200 to 800 mg. daily, with the usual oral dose of 100 mg. up to 4 times a day; the usual intravenous dose of 100 to 350 mg., followed by if indicated 100 to 150 mg. at a later period, and the usual intramuscular dose of 100 to 300 mg. every 6 to 8 hours, with 3 to 4 injections per day. For household animals, such as dogs, the administrable dose is about 30 to 200 mg. about every 6 to 8 hours.

For administering to valuable household animals, such as dogs, or for administering to laboratory animals such as mice, for scientific studies, the compound is prepared in the form of an injectable, or in the form of a food premix, such as mixing with dry meal, mash and the like, and then the prepared premix is added to the regular feed, thereby administering the compound to the domestic or laboratory animal.

The novel therapeutic compounds of the invention can also be formulated into compositions comprising other compounds useful in the symptomatic therapy of epilepsy and other states characterized by involuntary movements such as chorea and Parkinson's syndrome. For example β-N'N'-diethylaminoethyl-2,2-diphenyl hydantoate can be mixed with 5,5-diphenyl-2,4-imidazolidinedione for oral administration at the rate of 200 mg. to 600 mg. daily, for example as administered in capsule form. Typical capsules comprise 15 mg. or 50 mg. of β-N'N'-diethylaminoethyl-2,2-diphenyl hydantoate and 15 mg. or 50 mg. of 5,5-diphenyl-2,4-imidazolidendione for oral administration up to 4 times a day.

The novel and useful hydantoates of the invention are adaptable for administration for their physiological antiepileptic and anticonvulsant effects from drug delivery systems, such as skin delivery systems, gastrointestinal drug delivery devices, and the like, wherein the delivery device is manufactured from naturally occurring and synthetic polymeric materials. Representative of materials acceptable for the fabrication of drug delivery systems containing the compounds for controlled drug administration include materials such as polyvinyl chloride, polyisoprene, polybutadiene, polyethylene, ethylene-vinyl acetate copolymers, polydimethylsiloxane, hydrophillic hydrogels of esters of acrylic and methacrylic acid, polyvinyl acetates, propylene-vinyl acetate copolymers, and the like.

The above examples and disclosure are set forth merely for illustrating the mode and the manner of the invention and various modifications and embodiments can be made by those skilled in the art, in the light of the invention, without departing from the spirit of the invention.

What is claimed is:

1. Compounds of the formula:

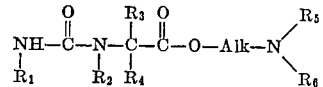

wherein $R_1$ and $R_2$ are a member selected from the group consisting of hydrogen and lower alkyl, $R_3$ and $R_4$ are a member selected from the group consisting of hydrogen, lower alkyl and phenyl, $R_5$ and $R_6$ are a member selected from the group consisting of hydrogen and lower alkyl, Alk is an alkylene of 1 to 4 carbon atoms, and pharmaceutically acceptable salts thereof.

2. A compound according to claim 1 wherein the compound β-N'N'-diethylaminoethyl-5-methyl-2,2 - diphenyl hydantoate.

3. A compound according to claim 1 wherein the compound is β-N'N'-dimethylaminoethyl-2-ethyl-5-methyl-2-phenyl hydantoate.

4. A compound according to claim 1 wherein the compound is β-N'N-diethylamino-2,2-diphenyl hydantoate.

5. A compound according to claim 1 wherein the compound is β-N'N'-dimethylaminoethyl-2,2-diphenyl hydantoate.

6. A compound according to claim 1 wherein the compound is β-N'N'-dimethylaminoethyl-2,2-diphenyl 5-isopropyl hydantoate.

7. A compound according to claim 1 wherein the compound is β-N'N'-diisopropylaminoethyl-2,2-diphenyl hydantoate.

8. A compound according to claim 1 wherein the compound is β-N'N'-dimethylaminoethyl-2,2 - diphenyl - 5-methyl hydantoate.

References Cited
UNITED STATES PATENTS 3,519,680    7/1970    Wismer et al.    260—472

LORRAINE A. WEINBERGER, Primary Examiner

L. A. THAXTON, Assistant Examiner

U.S. Cl. X.R.

260—309.5, 482 R; 424—309, 311

UNITED STATES PATENT OFFICE
CERTIFICATE OF CORRECTION

Patent No. 3,792,081  Dated February 12, 1974

Inventor(s) Takeru Higuchi and Valentino J. Stella

It is certified that error appears in the above-identified patent and that said Letters Patent are hereby corrected as shown below:

<u>In the inventors' addresses</u>: " Forest Park, Ill. " should read <u>Lawrence, Kans.</u> for the inventor Stella.

<u>In the assignee's name</u>: " Alza Corporation " should read <u>INTERx Research Corporation.</u>

Signed and sealed this 14th day of May 1974.

(SEAL)
Attest:

EDWARD M.FLETCHER,JR.
Attesting Officer

C. MARSHALL DANN
Commissioner of Patents